United States Patent
Kondo

(10) Patent No.: US 11,055,703 B2
(45) Date of Patent: Jul. 6, 2021

(54) SMART CONTRACT LIFECYCLE MANAGEMENT

(71) Applicant: Hitachi, Ltd., Tokyo (JP)

(72) Inventor: Yuki Kondo, Cupertino, CA (US)

(73) Assignee: HITACHI, LTD., Tokyo (JP)

(*) Notice: Subject to any disclaimer, the term of this patent is extended or adjusted under 35 U.S.C. 154(b) by 394 days.

(21) Appl. No.: 15/626,236

(22) Filed: Jun. 19, 2017

(65) Prior Publication Data

US 2018/0365686 A1 Dec. 20, 2018

(51) Int. Cl.
*G06Q 20/38* (2012.01)
*H04L 29/06* (2006.01)
*H04L 9/32* (2006.01)
*G06F 30/20* (2020.01)

(52) U.S. Cl.
CPC ......... *G06Q 20/382* (2013.01); *H04L 9/3239* (2013.01); *H04L 63/065* (2013.01); *H04L 63/123* (2013.01); *G06F 30/20* (2020.01); *H04L 2209/38* (2013.01); *H04L 2463/121* (2013.01)

(58) Field of Classification Search
None
See application file for complete search history.

(56) References Cited

U.S. PATENT DOCUMENTS

| | | | |
|---|---|---|---|
| 7,680,830 B1 | 3/2010 | Ohr et al. | |
| 10,931,478 B2 * | 2/2021 | Nunes | H04L 45/64 |
| 2015/0348017 A1 * | 12/2015 | Allmen | G06Q 20/401 705/76 |
| 2017/0220815 A1 * | 8/2017 | Ansari | G06Q 20/389 |
| 2017/0230189 A1 * | 8/2017 | Toll | H04L 9/3247 |
| 2017/0279818 A1 * | 9/2017 | Milazzo | H04L 63/145 |
| 2017/0353309 A1 * | 12/2017 | Gray | G06F 21/51 |
| 2018/0025435 A1 * | 1/2018 | Karame | H04L 9/3236 705/30 |
| 2018/0096349 A1 * | 4/2018 | McDonald | G06Q 20/102 |
| 2018/0173719 A1 * | 6/2018 | Bastide | G06F 16/13 |
| 2018/0300693 A1 * | 10/2018 | Gopinath | G06Q 20/4016 |

OTHER PUBLICATIONS

"Barry W. Boehm; Donald J. Reifer, A Spiral Model of Software Development and Enhancement, 2007, Wiley-IEEE Press, Chapter 2, 33-38" (Year: 2007).*

* cited by examiner

*Primary Examiner* — Christopher Bridges
*Assistant Examiner* — Toan Duc Bui
(74) *Attorney, Agent, or Firm* — Mattingly & Malur, PC

(57) ABSTRACT

In some examples, a first node is able to communicate with one or more second nodes for participating in a consensus system. The first node may receive, from a computing device, a request to execute a first smart contract associated with a first blockchain. The first node may invoke execution of the first smart contract to cause the first smart contract to execute a transaction by reading at least a portion of transaction data from the first blockchain as a transaction result. Further, the first node may check whether a simulation indicator has been set, which indicates that an expiration time of the first smart contract has been reached. Based on determining that the first smart contract has the simulation indicator set, the first node refrains from writing the transaction result to the blockchain as a valid transaction result and sends the transaction result to the computing device.

20 Claims, 8 Drawing Sheets

218 ↘

| ID (302) | Status (304) | Expiration Time (306) | Storage Period (308) |
|---|---|---|---|
| 1001 | Run | 12/31/2020 | 12/31/2025 |
| 1002 | Simulate | 12/31/2017 | 12/31/2022 |
| 1003 | Stop | 12/31/2015 | 12/31/2016 |
| ⋮ | ⋮ | ⋮ | ⋮ |

SMART CONTRACT PERIOD DATA STRUCTURE

| ID | 1001 |
|---|---|
| Type | Invoke Response |
| Status | Success |
| Message | null |
| Payload | Value X=100, ... |
| Timestamp | Mon Feb 10 12:03:37 UTC 2017 |

RUNNING MODE - MESSAGE: SUCCESS

| ID | 1001 |
|---|---|
| Type | Invoke Response |
| Status | Error |
| Message | Invalid Transaction |
| Payload | Error: Transaction request denied... |
| Timestamp | Wed Mar 10 11:58:02 UTC 2017 |

RUNNING MODE - MESSAGE: ERROR

| ID | 1002 |
|---|---|
| Type | Simulate Response |
| Status | Success |
| Message | null |
| Payload | Value X=100, ... |
| Timestamp | Wed Mar 10 12:16:26 UTC 2017 |

SIMULATION MODE - MESSAGE: SUCCESS

FIG. 4C

SMART CONTRACT LIFECYCLE MANAGEMENT

BACKGROUND

A blockchain is a type of distributed database that maintains a continuously growing series (i.e., a chain) of records called blocks. Each block contains a timestamp and a link to a previous block. The blocks may store information about transactions or other types of information. The verification process for a block may be performed fairly simply, which reduces the possibility of fraudulent transactions. By storing data in multiple blockchains in a distributed fashion at multiple locations across a network, blockchain technology reduces or eliminates the risks that come with data being held centrally.

Further, blockchain technology can make it very difficult to alter retroactively any single block of the chain. For example, because the database is distributed (i.e., stored on a plurality of different computers concurrently), all users with access to any one computer in the distributed database may be notified immediately of new additions to the blockchain.

In some cases, the information recorded using a blockchain may be for "smart contracts" which are computer-executable "agreements" between two or more parties. In particular, the smart contract may be software that is configured to execute for performing a specified action in response to a specified condition being met. The execution of a smart contract may be both automatable and enforceable.

SUMMARY

Some examples herein include a consensus system in which a first node is able to communicate with one or more second nodes for participating in the consensus system. The first node may receive, from a computing device, a request to execute a first smart contract of a plurality of smart contracts. The first smart contract may be associated with a first blockchain of a plurality of blockchains. The first node invokes execution of the first smart contract based on the received request to cause the first smart contract to execute a transaction based on the received request. For example, executing the transaction may include reading at least a portion of transaction data from the first blockchain as a transaction result. The first node may determine whether the first smart contract has a simulation indicator set. For instance, the simulation indicator may indicate that an expiration time of the first smart contract has been reached. Based on determining that the first smart contract has the simulation indicator set, the first node may refrain from writing the transaction result to the blockchain as a valid transaction result and sends the transaction result to the computing device in a response message.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example data structure of a smart contract period data structure according to some implementations.

FIG. 4A illustrates an example data structure of a smart contract response message when the smart contract is executed successfully according to some implementations.

FIG. 4B illustrates an example data structure of a smart contract response message when the smart contract execution fails according to some implementations.

FIG. 4C illustrates an example data structure of a smart contract response message when the smart contract is executed in simulation mode according to some implementations.

DETAILED DESCRIPTION

Figure 1:
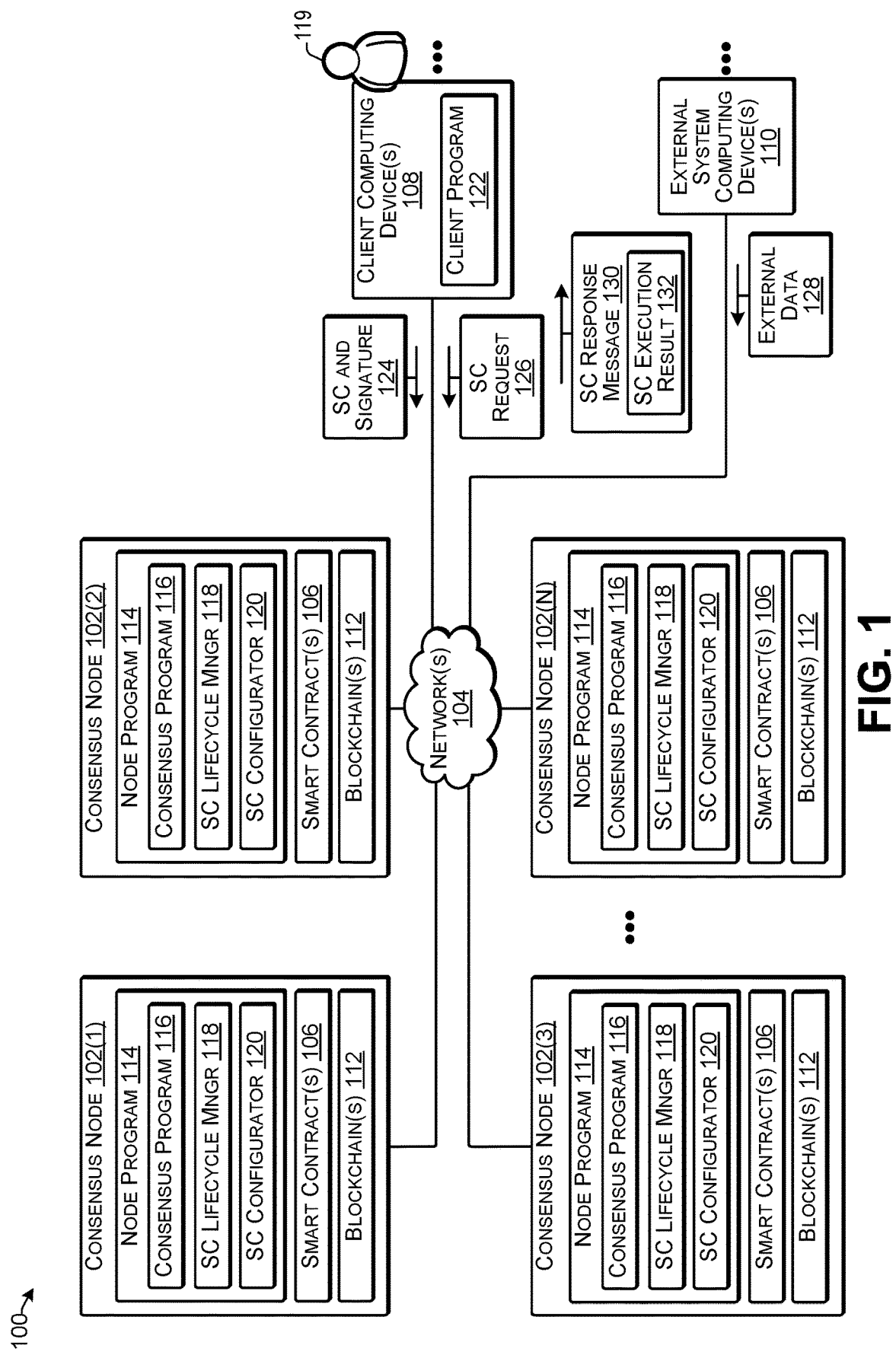
FIG. 1 illustrates an example architecture of a system for blockchain execution and smart contract management according to some implementations.

Some implementations herein are directed to techniques and arrangements for managing the lifecycle of a smart contract implemented using blockchain technology. For instance, a smart contract lifecycle may be managed by managing smart contract features to create, update, expire, and delete smart contracts, thereby enabling use of smart contracts in real-world applications. For instance, the smart contracts used in conjunction with the blockchains herein may enable many different practical applications, such as equipment control, asset management, inventory management, supply chain management, financial transaction tracking, and so forth, as enumerated additionally elsewhere herein.

As one example of smart contract lifecycle management, a user may create a new smart contract and may invoke the smart contract to execute a transaction, or the like. The result and/or other information of the transaction may be stored on a blockchain. For example, one or more blocks may be added to the blockchain of the smart contract for creating a substantially unalterable record of the transaction. Multiple users can access and read the data on the blockchain, such as for obtaining information about one or more transactions that may have been executed by the smart contract. Additionally, one or more of the users may upgrade the smart contract and the users may continue to use the upgraded smart contract.

The smart contract may typically have an expiration date and time (hereinafter "expiration time") on which the smart contract expires (e.g., revocation and/or termination of the smart contract). Upon expiration of the smart contract, the users normally can no longer execute transactions using the smart contract. However, implementations herein enable the users to continue to have access to the data on the blockchain, such as for auditing or other purposes after the smart contract has expired. Additionally, the smart contracts herein may have a specified storage period following expiration of the smart contract, and may be deleted or otherwise undeployed at the end of the storage period. Prior to the end of the storage period, the transaction information from the smart contract (e.g., results from transactions conducted by the smart contract) may continue to be accessed on the blockchain by the users using a simulation mode. After the storage period ends, the blockchain may be undeployed (e.g., stopped, archived, deleted, or the like), and the users may no longer be able to read or otherwise access the smart contract data on the blockchain.

Implementations herein provide or otherwise enable features for smart contract lifecycle management. For instance, some examples herein enable status control of a smart contract in accordance with an expiration time and a storage period. Further, examples herein enable data access after the expiration time of the smart contract has been reached, but before the end of the storage period. Additionally, some examples enable stopping a smart contract automatically in accordance with an expiration time while, during a storage period of the smart contract, still enabling access to information stored on the blockchain resulting from execution of the smart contract prior to the expiration of the smart contract.

In implementation's herein, the data produced by the smart contract may be stored in a specified and/or designated blockchain. To access the data in the blockchain, a user may invoke a query function of the smart contract by sending a smart contact request that includes the query as a transaction request. This query function can typically be called while the smart contract is running (i.e., before the expiration time is reached), but conventionally there is no way to access the data when the expiration time of the smart contract has been reached and the smart contract is no longer running.

Some examples herein include a smart contract configurator that may control the status of the smart contract in accordance with the expiration time and storage period of the smart contract. In addition, examples herein include a smart contract lifecycle manager to manage the lifecycle of the smart contract to allow users to access the data of the smart contract stored in the blockchain between the start of the expiration time and the end of the storage period. Additionally, in some cases, the status of the smart contract may be changed from "run" to "simulate" when the expiration time is reached, and may then be changed from "simulate" to "stop" when the end of the storage period is reached.

When the status of the smart contract is in "simulate" mode, the smart contract is able to execute in simulation mode to execute a transaction, but the smart contract is not able to update the blockchain by writing the result of the transaction to the blockchain as a valid transaction result. Accordingly, the simulation mode differs from the run mode in that valid updating of the blockchain is prevented. In this way, the users may access the data in the blockchain after the expiration time by running the smart contract in simulation mode, i.e., by executing a transaction using the smart contract, and by preventing the blockchain from being updated with the result of executing the transaction under the smart contract in simulation mode. When the smart contract is in "stop" status, the smart contract may be undeployed and stopped from executing altogether.

Implementations herein may include several different ways to prevent updating of the blockchain in simulation mode. As one example, the result of the transaction under the smart contract in simulation mode may be discarded by skipping the consensus process. Bypassing the consensus process may prevent updating of the blockchain with the transaction result. In another example, an invalid flag may be added to the transaction result in simulation mode to indicate an invalid transaction. After running the consensus process, the invalid transaction result may be attempted to be stored to the blockchain, but the invalid flag prevents the consensus system from updating of the blockchain with the invalid transaction result.

For discussion purposes, some example implementations are described in the environment of blockchains used in connection with execution of smart contracts. However, implementations herein are not limited to the particular examples provided, and may be extended to blockchains and similar data structures used for other applications, other types of computing systems, other system architectures, and so forth, as will be apparent to those of skill in the art in light of the disclosure herein.

FIG. 1 illustrates an example architecture of a system 100 according to some implementations. The system 100 includes a plurality of consensus node computing devices 102(1), 102(2), 102(3), . . . , 102(N), referred to hereinafter as consensus nodes 102, that are able to communicate with each other over one or more networks 104 such as with respect to at least one smart contract 106. Additionally, the consensus nodes 102 are able to communicate through the one or more networks 104 with one or more client computing devices 108 and/or one or more external system computing devices 110.

In some examples herein, the system 100 is a scalable, decentralized peer-to-peer system able to generate and maintain at least one blockchain 112. Thus, the integrity of the data is based on a consensus mechanism rather than, e.g., a mere trust-based infrastructure. In examples herein, "consensus" may refer to a collective decision-making process or agreement as to what is true or false. For instance, the system 100 provides a distributed consensus network made up of the participating consensus nodes 102 in which the various different consensus nodes 102 participating in the system 100 may come to an agreement. Individual consensus nodes 102 may each contribute their own data to enable the consensus network as a whole to achieve a collective agreed-upon decision.

The system 100 is configured to record the chronological order of transactions or other information from the smart contract(s) 106 as successive blocks in the blockchain(s) 112. Thus, each blockchain 112 may serve as a distributed database for the corresponding transactions stored in the blocks therein. As a result, the transaction records are securely recorded and practically unalterable. All the consensus nodes 102 in the system 100 may include the same smart contract(s) 106 and the same blockchain(s) 112, and may execute respective instances of the same node program 114 (including a consensus program 116, a smart contract lifecycle manager 118, and a smart contract configurator 120) against the same transactions, and thus may validate (or invalidate) each transaction and may add transaction information to the blockchain 112 for each transaction. Valid transactions are written to a next block in the blockchain 112. As discussed below, in some embodiments, invalid transactions are also written in the blockchain 112 with an invalid flag to indicate that the blockchain 112 is not updated with the invalid transactions. As one example, a block may be added to the blockchain for the invalid transaction, but the block is marked as invalid. The consensus nodes 102 may also add transaction results and/or other transaction information to the blockchain, such as for each transaction, i.e., corresponding to each execution of a respective smart contract 106. For instance, in some example, there may be a one-to-one relationship between a particular smart contract 106 and a respective blockchain 112 for storing transaction information for that particular smart contract 106.

In some examples, the decentralized peer-to-peer nature of the system 100 herein may help prevent any single user or group of users from controlling the underlying infrastructure or undermining the integrity of the system 100. For instance, users 119 (e.g., at client node(s) 108) of the system 100 may all have equal status and may adhere to the same protocols. In some cases, the users 119 may be individuals, corporations, state actors, organizations, and so forth, or a combination of any of these entities. In some examples herein, the system 100 may be private (i.e., not generally accessible to the public) and the consensus nodes 102 may typically be owned by, operated by, or otherwise associated with one or more of the users. For instance, in some cases, some of the consensus nodes 102 may be associated with a first participant to the smart contract 106, and some other ones of the consensus nodes 102 nodes may be associated with a second participant to the smart contract 106. Of course, in other cases, some or all of the consensus nodes 102 may be associated with a third party who is not associated with either the first participant or the second participant.

The consensus nodes 102 may each maintain a copy of the blockchain 112 and may participate in validating transactions conducted according to the smart contract 106. For instance, the system 100 may be used for executing one or more smart contracts 106 for a variety of different applications, such as for tracking supply chains for products, performing asset management regarding usage of enterprise assets, tracking crowdfunding projects, generating cryptocurrency, making the results of governance publically available, decentralizing file storage, managing internet of things (IoT) devices, protecting intellectual property, managing data, registering land titles, tracking stock trades, tracking banking transactions, and so forth.

The smart contracts 106 used in conjunction with the blockchain technology herein may be used to perform the above-discussed example applications or any of numerous other applications. As mentioned above, a smart contract may include an agreement that between the parties a specified function will be performed when a specified condition is met. Thus, the smart contract 106 may be executable code programmed to specify a condition to be met and a corresponding function to be performed, and the blockchain 112 may ensure that the condition is met and the corresponding function is automatically carried out.

As one example, with respect to the IoT, smart contracts may be used for automating the management of remote IoT systems, such as for automatically controlling the temperature in different zones in a building based on a plurality of detected conditions. As another example, smart contracts 106 and blockchains 112 may be used for enterprise asset management, e.g., for managing the usage and lifecycle of physical assets of an organization. As another example, smart contracts 106 and blockchains 112 may be used for executing and recording financial transactions, such as brokerage transactions, e.g., paying a derivative when a financial instrument meets a certain benchmark, buying/selling a stock when a certain price is reached, etc. As still another example, smart contracts 106 and blockchains 112 may be used for automatically redistributing electric power, such as in the case that a local solar microgrid produces excess energy, the smart contract 106 and blockchain 112 may be used to automatically redistribute the excess energy. Numerous other functions may be performed using blockchains 112 and smart contracts 106, with the examples discussed herein being only a few of the many possible applications.

When the smart contract 106 is first set up or otherwise established, the one or more participants (i.e., users) in the smart contract 106 may use a respective client program 122 on a respective client computing device 108 to digitally sign the smart contract. For example, the client program 122 may be executed to configure the client computing device to send the smart contract 106 and digital signature 124 for the smart contract to the consensus nodes 102 that will execute the smart contract 106. Thus, as discussed below, the consensus nodes 102 may verify that the smart contract 106 is signed before executing the smart contract 106.

In some examples, after the smart contract has been provided to the consensus nodes 102 and is made active, i.e., is "running", the smart contract 106 may be executed when a condition specified in the smart contract 106 is satisfied. In some examples, the execution of the smart contract 106 may be dependent on receipt of external data from the one or more external system computing devices 110. For example, an external system computing device 110 may be configured to send external data 128 to the consensus nodes 102. Depending on the nature of the smart contract 106, the external data 128 may be any corresponding type of data. For example, if the smart contract is for control of one or more thermostats in a building, the external data 128 may be temperature data of zones corresponding to the thermostats. If the smart contract is for managing one or more securities, the external data 128 may be current stock market information, or the like. Numerous other types of external data 128 will be apparent to those of skill in the art in view of the examples discussed above and the disclosure herein. Upon receipt of the external data 128, the consensus nodes 102 may determine to execute the smart contract. Each consensus node 102 may execute the smart contract 106 as a transaction.

As another example, a communication from one of the client computing devices 108 to the consensus nodes 102 may include a smart contract request 126. The smart contract request 126 may cause the smart contract 106 to execute, such as to provide information to the client computing device(s) 108 in a smart contract (SC) message 130. For instance, the consensus nodes 102 may send the SC message 130 (e.g., which may include one or more execution results) to the client computing device(s) 108.

Additionally, or alternatively, in some examples, following each execution of the smart contract 106, an SC message 130 including a smart contract execution result 132 may be sent to at least one of the client computing device(s) 108 and/or the external system computing device(s) 110. For example, receipt of the SC message 130 including the SC execution result 132 may cause the client computing device 108 or the external system computing device 110 to perform a function based on the SC execution result 132. For example, if the smart contract 106 is for control of a thermostat, the SC execution result 132 may cause a system program of an external system computing device 110 to increase or decrease the thermostat a specified amount. In some examples, the SC execution result 132 may include the entire blockchain 112. In other examples, the SC execution result 132 may include only an output value of the smart contract. Further, in some example, the SC message 130 may not include the SC execution result 132, but may include other information, as discussed additionally below. Numerous other variations will be apparent to those of skill in the art having the benefit of the disclosure herein.

Figure 2:
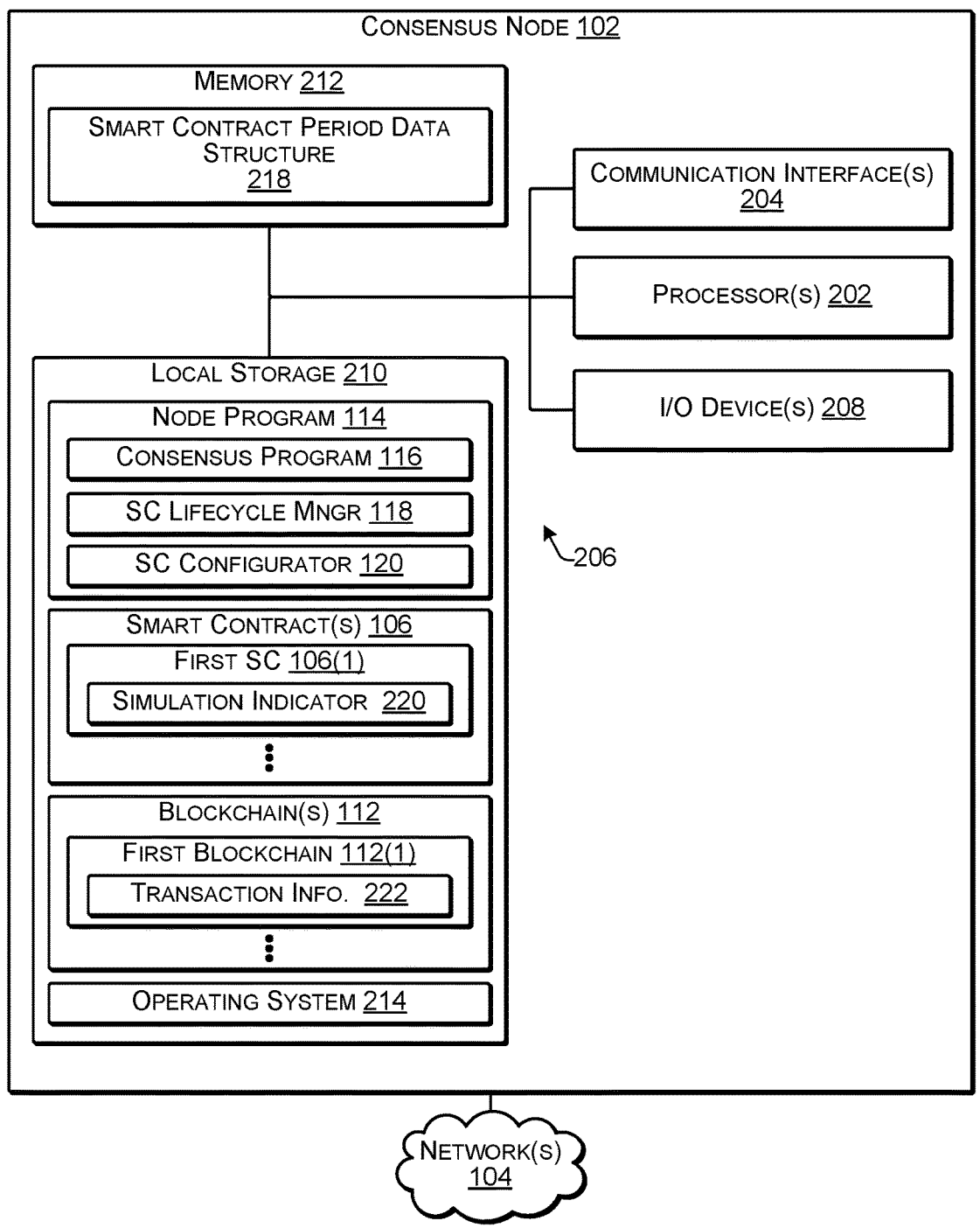
FIG. 2 illustrates an example consensus node computing device according to some implementations.

FIG. 2 illustrates an example of a consensus node 102 according to some implementations. In some cases, the consensus nodes 102 may include a plurality of physical servers or other types of computing devices that may be embodied in any number of ways. For instance, in the case of a server, the modules, programs, other functional components, and a portion of data storage may be implemented on the servers, e.g., at one or more server farms or data centers, cloud-hosted computing services, and so forth, although other computer architectures may additionally, or alternatively, be used. In the illustrated example, the consensus node 102 includes, or may have associated therewith, one or more processors 202, one or more communication interfaces 204, one or more computer-readable media 206, and one or more input/output (I/O) devices 208. For example, the computer-readable media 206 may include a local storage 210 and a memory 212. Further, while a description of one consensus node 102 is provided, the other consensus nodes 102 may have the same or similar hardware and software configurations and components. Additionally, the client computing device(s) 108 and any external system computing device(s) may have similar hardware configurations with different programs, software, and other functional components thereon.

Each processor 202 may be a single processing unit or a number of processing units, and may include single or multiple computing units, or multiple processing cores. The processor(s) 202 can be implemented as one or more central processing units, microprocessors, microcomputers, microcontrollers, digital signal processors, state machines, logic circuitries, and/or any devices that manipulate signals based on operational instructions. For instance, the processor(s) 202 may be one or more hardware processors and/or logic circuits of any suitable type specifically programmed or configured to execute the algorithms and processes described herein. The processor(s) 202 can be configured to fetch and execute computer-readable instructions stored in the computer-readable media 206, which program the processor(s) 202 to perform the functions described herein.

The computer-readable media 206 may include volatile and nonvolatile memory and/or removable and non-removable media implemented in any type of technology for storage of information such as computer-readable instructions, data structures, program code, or other data. For example, the computer-readable media 206 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the consensus node 102, the computer-readable media 206 may be a tangible non-transitory medium to the extent that, when mentioned, non-transitory computer-readable media exclude media such as energy, carrier signals, electromagnetic waves, and/or signals per se. In some cases, the computer-readable media 206 may be at the same location as the consensus node 102, while in other examples, the computer-readable media 206 may be separate or partially remote from the consensus node 102.

The computer-readable media 206 may be used to store any number of functional components that are executable by the processor(s) 202. In many implementations, these functional components comprise instructions, modules, or programs that are executable by the processor(s) 202 and that, when executed, specifically program the processor(s) 202 to perform the actions attributed herein to the consensus node 102. Functional components stored in the computer-readable media 206 may include the node program 114, which includes the smart contract configurator 120, the smart contract lifecycle manager 118, and the consensus program 116. Additional functional components include the smart contract(s) 106 and an operating system (OS) 214, which may control and manage various functions of the consensus node 102. For instance, the smart contract(s) 106 include at least a first smart contract 106(1) that may be executed on the consensus node 102 as discussed additionally below.

Each of the functional components may include one or more computer programs, applications, executable code, computer-readable instructions, or portions thereof. Further, while the smart contract configurator 120, the smart contract lifecycle manager 118, and the consensus program 116 are illustrated as executable instructions that are part of the node program 114 in this example, in other examples, these components may each include one or more separate programs, modules or other executable instructions, and/or may be combined into a single program, and so forth. In some cases, the functional components may be stored in the local storage 210 of the computer-readable media 206, loaded into the memory 212 of the computer-readable media 206, and executed by the one or more processors 202. Numerous other software and/or hardware configurations will be apparent to those of skill in the art having the benefit of the disclosure herein.

In addition, the computer-readable media 206 may store data and data structures used for performing the functions and services described herein. For example, the computer-readable media 206 may store data, metadata, data structures, and/or other information used by the node program 114, the smart contract(s) 106, and/or the OS 214. For instance, some or all of the consensus nodes 102 may maintain the blockchain(s) 112, as well as a smart contract period data structure (DS) 218. For example, the smart contract period DS 218 may be generated and updated by the smart contract configurator 120 or other functional component. Additionally, the blockchain(s) 112 may include at least a first blockchain 112(1) that corresponds to the first smart contract 106(1), and that stores or otherwise maintains transaction information 222 for a plurality of transactions executed by the first smart contract 106(1) before the expiration time for the first smart contract is reached.

Each consensus node 102 may also include or maintain other functional components and data, which may include programs, drivers, etc., and other data used or generated by the functional components. Further, the consensus node 102 may include many other logical, programmatic, and physical components, of which those described above are merely examples that are related to the discussion herein.

The communication interface(s) 204 may include one or more interfaces and hardware components for enabling communication with various other devices, such as over the network(s) 104. Thus, the communication interfaces 204 may include, or may couple to, one or more ports that provide connection to the network(s) 104 for communication with other consensus nodes 102, the client device(s) 108, and any external system computing device(s) 110 (not shown in FIG. 2). For example, the communication interface(s) 204 may enable communication through one or more of a LAN (local area network), WAN (wide area network), the Internet, cable networks, cellular networks, wireless networks (e.g., Wi-Fi) and wired networks (e.g., Fibre Channel, fiber optic, Ethernet), direct connections, as well as closerange communications such as BLUETOOTH®, and the like, as additionally enumerated elsewhere herein.

The one or more networks 104 may include any suitable communication technology, including a wide area network, such as the Internet; a local area network, such as an intranet; a wireless network, such as a cellular network; a local wireless network, such as Wi-Fi; short-range wireless communications, such as BLUETOOTH®; a wired network including Fibre Channel, fiber optics, Ethernet, or any other such network, a direct wired connection, or any combination thereof. Thus, the network(s) 104 may include wired and/or wireless communication technologies. The protocols used to communicate over such networks are well known in the art and will not be discussed in detail in this disclosure.

In some cases, the I/O devices 208 may include a display, various user interface controls (e.g., mouse, keyboard, touch screen, etc.), audio speakers, connection ports, and so forth. Numerous other hardware and software configurations will be apparent to those of skill in the art having the benefit of the disclosure herein. Thus, the scope of the examples disclosed herein is not limited to a particular set of hardware, software, or a combination thereof.

FIG. 3 illustrates an example data structure of the smart contract period data structure (DS) 218 according to some implementations. This data structure may be a table or other desired data structure, and may be maintained in the consensus node memory 112 by the smart contract configurator 120, as discussed above with respect to FIG. 2. In the illustrated example, column 302 includes an ID (identifier) of smart contract(s) 106 that may be executed on the consensus node 102. Column 304 includes a status of the smart contract(s) 106. Column 306 includes an expiration time of the smart contract(s) 106. Column 308 includes a storage period of the smart contract(s) 106.

Each row in the smart contract period DS 218 may be created per smart contract. The example of FIG. 3 includes entries for three different smart contracts having smart contract IDs 1001, 1002, and 1003, respectively. The status 304 of the smart contract may include a status designation of one of "run", "simulate," or "stop." The "run" status indicates that the smart contract is deployed and running, i.e., able to be executed for executing transactions or the like, depending on the nature and function of the respective smart contract. The "simulate" status indicates that the smart contract is deployed, but only available to execute in a simulation mode. The "stop" status indicates that the respective smart contract is undeployed and stopped, i.e., cannot be executed in running mode or in the simulation mode. The status 304 of each respective smart contract on the consensus node may be set and updated by the smart contract configurator 120, as discussed additionally below.

When the smart contract is deployed, the status 304 of the smart contract is set to "run." Each smart contract may have an associated expiration time 306 and storage period 308. For example, the expiration time 306 and storage period 308 may be established as part of the smart contract when the smart contract is initially entered into by the parties. In some cases, the expiration time 306 and/or the storage period 308 may be updated or otherwise changed, such as through agreement of the parties to the smart contract, or the like. When the expiration time 306 is reached, the status 304 is migrated or otherwise changed from "run" to "simulate." When the storage period 308 ends, the status 304 is migrated or otherwise changed from "simulate" to "stop." As discussed below, the smart contract lifecycle manager 118 may be executed to check the expiration time 306 and storage period 308 for managing the lifecycle of each smart contract on the respective consensus node.

FIG. 4A illustrates an example data structure of a smart contract response message 130 that may be sent by a consensus node, e.g., to a client computing device, when the smart contract is executed successfully during a running mode according to some implementations. For example, when the SC message 130 is sent, the consensus nodes may have already executed a transaction using the smart contract, reached a consensus on the execution result, and added transaction information for the transaction, including the execution result, to at least one new block in the blockchain for the smart contract.

In the example of FIG. 4A, row 402 includes an ID of the smart contract(s) 106 that was executed on the consensus node 102. Row 404 includes a type of the smart contract response message. In this example, the type is set to "Invoke Response." Row 406 includes a status of the execution of the smart contract. In this case, the status is set to "Success", indicating that the transaction was performed successfully. Row 408 includes a message of the smart contract response message 130, which in this case is "null", as the transaction was completed successfully. Row 410 includes a payload of the smart contract response message 130, which may include the transaction execution result in some examples. For instance, in this example, the payload includes one or more values, such as a value X=100. As one non-limiting example, if the smart contract controls a thermostat, the value in the payload may be used for controlling the thermostat by a computing device that receives the smart contract response message 130. Additionally, row 412 includes a timestamp of the response message.

FIG. 4B illustrates an example data structure of a smart contract response message 130 when the smart contract execution fails according to some implementations. For example, the smart contract may not have executed properly on one or more of the consensus nodes and/or no consensus was reached among the consensus nodes regarding the execution result for the transaction. In this example, the type of the smart contract response message 130 in row 404 is set to "Invoke Response" and the status of the execution of the smart contract in row 406 is set to "Error." The message in row 408 indicates an "Invalid transaction." Furthermore, the payload in row 410 is set to an error message indicating that a transaction request was denied, or other cause of the error result.

FIG. 4C illustrates an example data structure of a smart contract response message 130 when the smart contract is executed in simulation mode according to some implementations. In examples herein, as mentioned above, when a particular smart contract is in "simulation" mode, the smart contract is permitted to run to execute a transaction, but the smart contract is not permitted to update the blockchain by writing the result of the transaction to the blockchain as a valid transaction result. Accordingly, the simulation mode differs from the run mode in that updating of the blockchain is prevented. In this way, the users of the client computing devices may access the data in the blockchain after the expiration time of the smart contract has been reached by running the smart contract in simulation mode. In the simulation mode, by executing a transaction using the smart contract, the user is able to obtain transaction information from the blockchain, and by preventing the blockchain from being updated with the result of executing the transaction under the smart contract in simulation mode, the integrity of the blockchain is maintained.

In the example of FIG. 4C, the type of the SC message 130 in row 404 is set to "Simulate Response" and the status on execution of the smart contract in row 406 is set to "Success." The message in row 408 is set to "null", as the execution of the transaction requested of the smart contract was successful. The payload in row 410 is set to the value(s) to be returned. Accordingly, the smart contract response message 130 may return transaction information or other content stored in the blockchain (e.g., the value X=100 in this example), without affecting the content of the blockchain.

FIGS. 5-8 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

Figure 5:
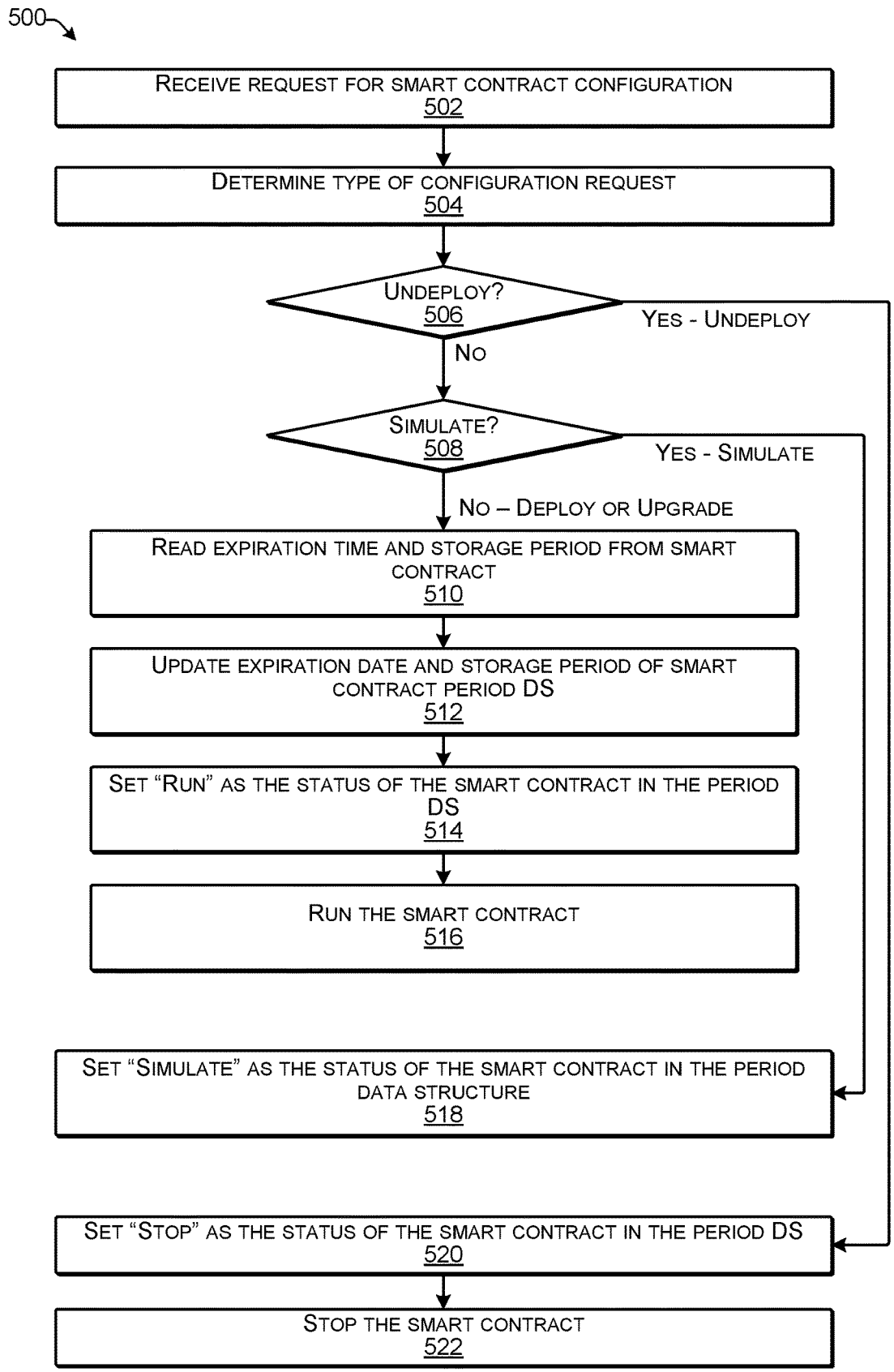
FIG. 5 is a flow diagram illustrating an example process performed by a smart contract configurator according to some implementations.

FIG. 5 is a flow diagram illustrating an example process 500 for a smart contract configurator 120 according to some implementations. The smart contract configurator 120 executes processes of deploy, upgrade, migrate to simulate, and undeploy of the smart contract. The process 500 may include an algorithm performed by the smart contract configurator 120 on each consensus node 102 by execution of the node program 114. For example, the node program 114 may be executed on each consensus node to configure the one or more processors of the consensus node to perform the process 500.

Figure 6:
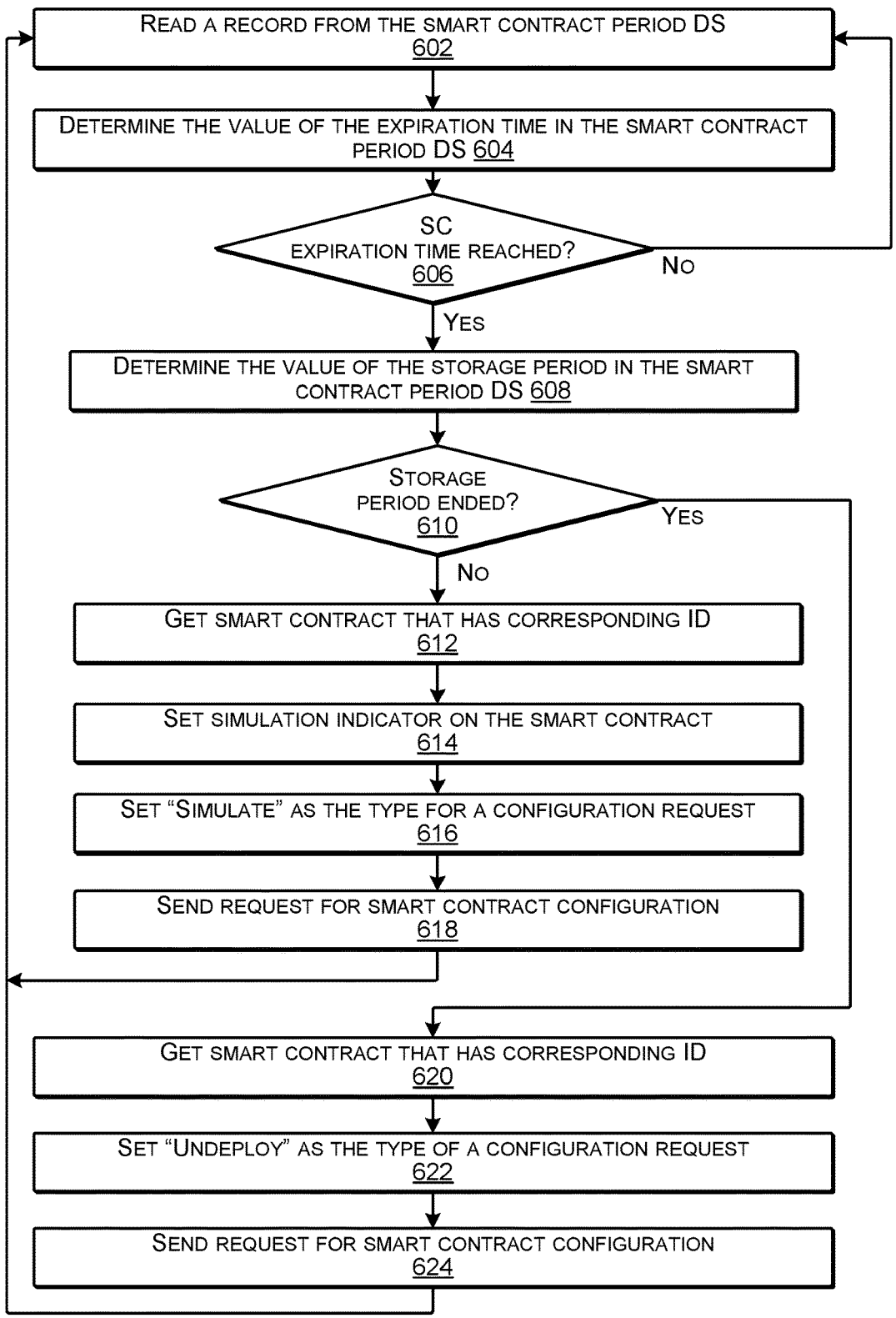
FIG. 6 is a flow diagram illustrating an example process performed by a smart contract lifecycle manager according to some implementations.

At 502, the smart contract configurator may receive a request for smart contract configuration (e.g., sent from the smart contract lifecycle manager 118, such as when performing the process 600 of FIG. 6). The request message may contain an indication of the smart contract program and the type of configuration request.

At 504, the smart contract configurator determines the type of configuration request from the request message, which may be "Deploy", "Upgrade", "Simulate", or "Undeploy".

At 506, the smart contract configurator determines whether the type of the configuration request is "undeploy" by checking the value of the type. If the type is "Undeploy", the process proceeds to 520 to stop and undeploy the smart contract. Otherwise, if the type is not "Undeploy", the process goes to 508.

At 508, the smart contract configurator determines whether the type of the configuration request is "Simulate". If the type is "Simulate," the process proceeds to 518 to change the smart contract to simulation mode. Otherwise, if the type is not "Simulate", the process goes to 510.

At 510, if the type is not "Undeploy" or "Simulate", then the type is either "Deploy" or "Upgrade", and the smart contract configurator reads the expiration time and storage period from the respective smart contract. For example, when the type is either "Deploy" or "Upgrade", the request is intended to deploy a new smart contract or upgrade an existing smart contract. When deploying a new smart contract, the smart contract configurator creates a new record for the new smart contract in the smart contract period DS 218 discussed above, e.g., with respect to FIG. 3. When upgrading an existing smart contract, the smart contract configurator may update an existing record for the smart contract in the smart contract period DS 218.

At 512, the smart contract configurator may update the expiration time and/or storage period of the smart contract period DS 218.

At 514, the smart contract configurator sets "Run" as the status of the smart contract in the smart contract period DS 218. In other words, the smart contract is ready to be executed on the respective consensus node.

At 516, the smart contract configurator runs the smart contract, i.e., makes the smart contract active on the respective consensus node. From this point forward, the smart contract can receive a smart contract request 126 from the client node 108 to execute transactions of the smart contract. As the transactions are executed, new blocks are added to the blockchain to record the transaction results and other transaction information (assuming consensus is reached).

At 518, if the type of the request at 508 is determined to be "Simulate", the smart contract configurator sets "Simulate" as the status of the smart contract in the smart contract period DS 218. From this point forward, the smart contract can receive a smart contract request 126 from the client node 108 to simulate a transaction of the smart contract, e.g., as discussed above with respect to FIG. 1.

At 520 if the type of the request at 506 is determined to be "Undeploy", the smart contract configurator sets "Stop" as the status of the smart contract in the smart contract period DS 218.

At 522, the smart contract configurator stops the smart contract. From this point forward, the smart contract can no longer receive a smart contract request 126 from the client node 108. In some examples, the corresponding blockchain may be deleted or archived.

FIG. 6 is a flow diagram illustrating an example process 600 that may be executed by the smart contract lifecycle manager 118 discussed above, e.g., with respect to FIG. 1, according to some implementations. For instance, the smart contract lifecycle manager may modify the smart contract to set a simulation indicator to change the status of the smart contract to simulation mode, and may send a request to the smart contract configurator to cause the smart contract configurator to reconfigure the smart contract to the simulation mode, e.g., as discussed above with respect to FIG. 5. In some cases, the process 600 may be executed automatically, e.g., periodically, based on the occurrence of a condition, or the like. In other examples, a system administrator or other user may cause process 600 to execute. As one example, the process may examine each entry in the smart contract period DS 218 in FIG. 3.

At 602, the smart contract lifecycle manager may read a record from the smart contract period DS 218.

At 604, the smart contract lifecycle manager determines the value of the expiration time 306 from the smart contract period DS 218.

At 606, the smart contract lifecycle manager determines whether the smart contract has expired by comparing the current time with the determined value of the expiration time 304. If the smart contract has passed the expiration time, the process goes to 608, if not the process 600 goes back to 602 to process a next record in the smart contract period DS 218, or if all records have been processed, the process 600 may end.

At 608, the smart contract lifecycle manager determines the value of the storage period 308 in the smart contract period DS for the selected record.

At 610, the smart contract lifecycle manger determines whether the smart contract has reached the end of the storage period 308 by comparing the current date with the determined value of the storage period 308. If the end of the storage period 308 has been reached, the process goes to 620. If the end of the storage period 308 has not yet been reached, the process goes to 612.

At 612, if the end of the storage period has not yet been reached, but the expiration time of the smart contract has been reached, the smart contract lifecycle manager gets the smart contract that corresponds to the ID 302 of the selected record from the smart contract period DS 218. For example, when the life of the smart contract has passed the expiration time, the smart contract is not allowed to write any more transaction results to the blockchain as valid transaction results. Accordingly, the status of the smart contract is changed to simulation mode.

At 614, the smart contract lifecycle manager sets a simulation indicator on the smart contract to indicate that the status of the smart contract has been changed to simulation mode. In simulation mode, a user is able to extract information from the blockchain by simulating a transaction with the smart contract, but no changes are made to the blockchain.

At 616, the smart contract lifecycle manager sets "Simulate" as the type for making a configuration request to the smart contract configurator.

At 618, the smart contract lifecycle manager sends a request for smart contract configuration to the smart contract configurator 120 (e.g., as discussed above at 502 of FIG. 5). The smart contract configurator may receive the request and update the smart contract period DS 218 as described above with respect to FIG. 5. The process 600 may then return to 602 to process a next record in the smart contract period DS 218, or if all records have been processed, the process 600 may end.

At 620, if at 610, the smart contract lifecycle manager determines that the storage period has ended, the smart contract lifecycle manager gets the smart contract that has the corresponding smart contract ID determined from column 302 in FIG. 3 for the selected record. After the storage period has ended, the smart contract is no longer allowed to read transaction data within the blockchain, and the smart contract may be undeployed.

At 622, the smart contract lifecycle manager sets "Undeploy" as the type of a configuration request for making a configuration request to the smart contract configurator.

At 624, the smart contract lifecycle manager sends a request for smart contract configuration to the smart contract configurator 120 (e.g., as discussed above at 502 of FIG. 5). The smart contract configurator receives the request and stops the smart contract as described above. The process 600 may then return to 602 to process a next record in the smart contract period DS 218, or if all records have been processed, the process 600 may end.

Figure 7:
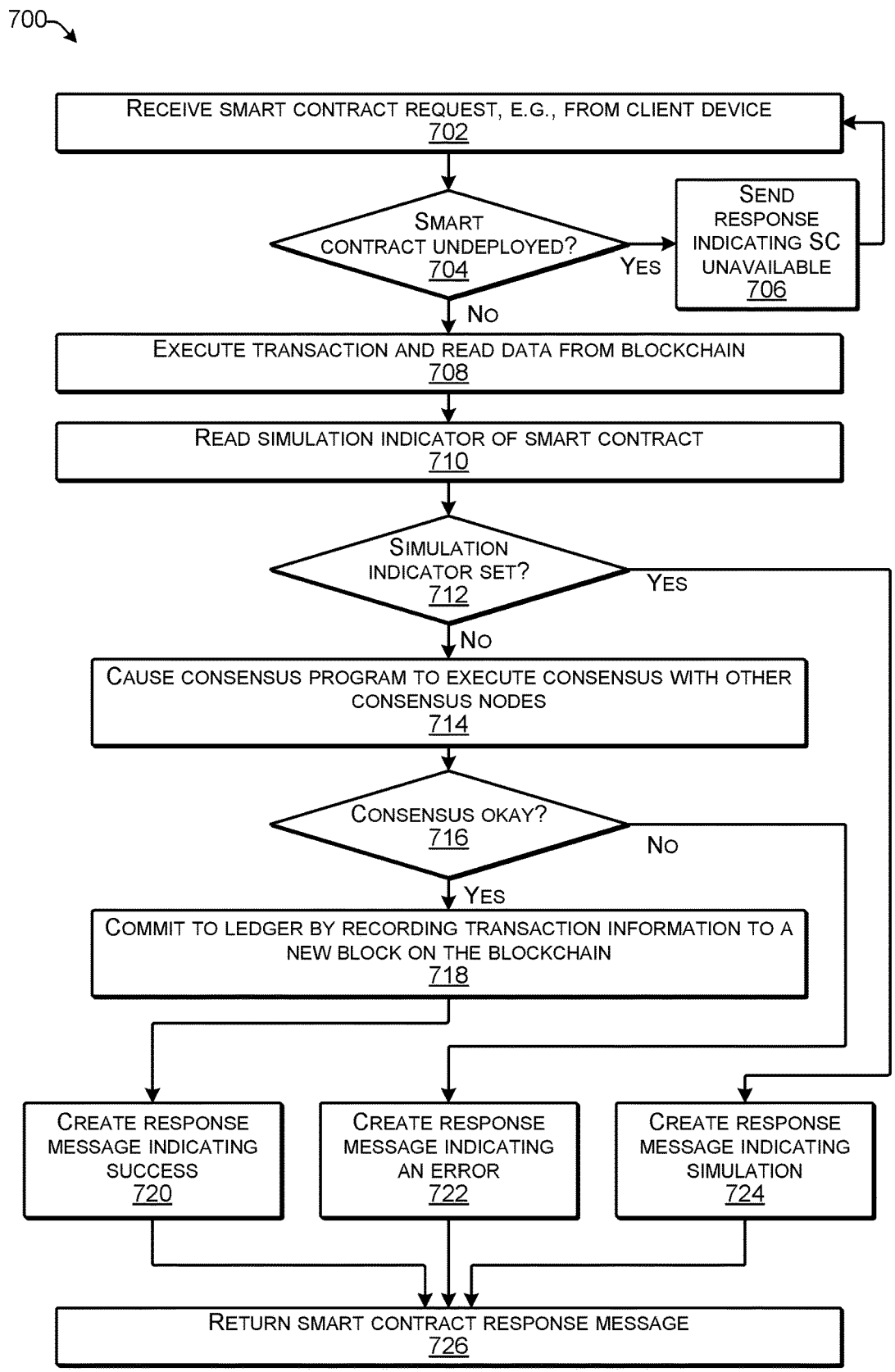
FIG. 7 is a flow diagram illustrating an example process for executing a smart contract with a blockchain that discards invalid transaction results according to some implementations.

FIG. 7 is a flow diagram illustrating an example process 700 for executing a smart contract in which the smart contract is configured to discard invalid transaction results according to some implementations. As one example, the smart contract 106 discussed above, e.g., with respect to FIG. 1, may receive a smart contract request 126, such as from the client computing device 108, and may execute a transaction in response to receiving the request. For example, the SC request 126 may be a query function that invokes that smart contract to conduct a transaction to retrieve data from the blockchain and return the retrieved data as a transaction result in the smart contract response message 130. The smart contract may return the smart contract response message 130 to the client computing device 108 in response to the SC request 126. In examples herein, causing a smart contract to "execute a transaction" may mean invoking one or more functions of the smart contract 106. The invoked functions may include logic to read and/or write data on the blockchain.

In some examples, the process 700 may be executed in part by the node program 114 and in part by the smart contract 106 itself. For example, the node program 114 may manage a plurality of smart contracts and corresponding blockchains on the consensus node 102. The node program 114 may receive and may respond to communications from client computing devices, external computing devices, and other consensus nodes 102. Furthermore, the node program may determine which smart contract a received communication applies to, and may invoke the particular smart contract that is the target of a communication based on a smart contract ID, client computing device ID, user ID, or other identifier associated with a received communication.

At 702, the consensus node may receive a smart contract request, e.g., from the client computing device, and may provide the received request to a particular smart contract corresponding to the request to invoke the smart contract to perform a transaction based on the request.

At 704, the consensus node may determine whether the smart contract is undeployed. For example, the consensus node may check the smart contract period data structured 218 to determine if the smart contract corresponding to the received request is stopped or otherwise undeployed.

At 706, if the smart contract is undeployed, the consensus node may send a response message to the computing device indicating that the smart contract is unavailable. For instance, the response message may indicate that status of the smart contract is stopped and/or that there was an error in attempting to execute the requested transaction.

At 708, the smart contract executes a transaction in response to the smart contract request. During execution of the transaction, the smart contract may read at least a portion of the data on the blockchain.

At 710, the smart contract 106 checks the simulation indicator of the smart contract. For example, each smart contract may have flag (e.g., a settable bit, or the like) or other type of indicator associated with it that may be turned on or off for indicating whether the smart contract is in simulation mode. Thus, if the simulation indicator is "set", that indicates that the smart contract is in simulation mode.

At 712, the smart contract 106 determines whether the simulation indicator is set to simulation mode or not. If the simulation indicator is set, the process goes to 724, and the result of the transaction is not stored on the blockchain. On the other hand, if the simulation indicator is not set, process goes to 714 so that the result of the transaction may be committed to the blockchain (after reaching consensus).

At 714, the smart contract 106 executes or causes execution of a consensus operation with other consensus nodes 102 in the consensus system. Any of various known consensus programs may be used for determining a consensus for the transaction result. As one example, a primary consensus node may be designated within the system to determine whether some or all of the consensus nodes 102 have reached a consensus on the transaction result. The primary node may then inform the other consensus nodes 102 of the consensus, or lack thereof. Numerous other variations will be apparent to those of skill in the art having the benefit of the disclosure herein.

At 716, the smart contract receives the response from the consensus program and determines whether a consensus was reached. If a consensus is reached, the process proceeds to 718 to commit the transaction result to the ledger (e.g., to a new block in the blockchain). On the other hand, if a consensus is not reached, the process goes to 722. Because a transaction that does not receive a consensus is invalid, committing the transaction result to the ledger is skipped in the implementation of FIG. 7.

At 718, if a consensus is reached, the smart contract 106 commits the transaction information to the ledger, i.e., by writing at least the result of the transaction to a new block of the blockchain. This may take place on each consensus node in the consensus system so that all of the blockchains for the same smart contract are the same on all of the consensus nodes.

At 720, the smart contract 106 may create a smart contract message indicating that the transaction was completed successfully. As one example, the smart contract message may include the ID of the smart contract, the type, status, message, payload, and timestamp, as illustrated and discussed above with respect to FIG. 4A. For instance, as discussed above, the type may be set as "invoke response" and the status is set as "success". In this example, the smart contract 106 commits the transaction information to the ledger only when a transaction is successfully executed under the smart contract not in simulation mode (e.g., the smart contract is deployed or an existing smart contract is being upgraded) and a consensus is reached for the execution result.

At 722, if a consensus is not reached at 716, the smart contract 106 creates a smart contract message indicating an error. As illustrated and discussed above with respect to FIG. 4B, the SC message may include the smart contract ID, the type, the status, the message, the payload, and the timestamp. In this situation, the type is set as "invoke response" and the status may indicate an error.

At 724, if the simulation indicator is determined to be set at 712, the smart contract 106 may create a smart contract message indicating the simulation. The smart contract message may include the smart contract ID, the type, the status, the message, the payload, and the timestamp, as illustrated in FIG. 4C. In this case, the type may be set as "simulate response" and the status may be set as "success".

At 726, the smart contract may return, or may otherwise cause the consensus node to return the smart contract message as a response to the client computing device or other computing device that sent the smart contract request.

Figure 8:
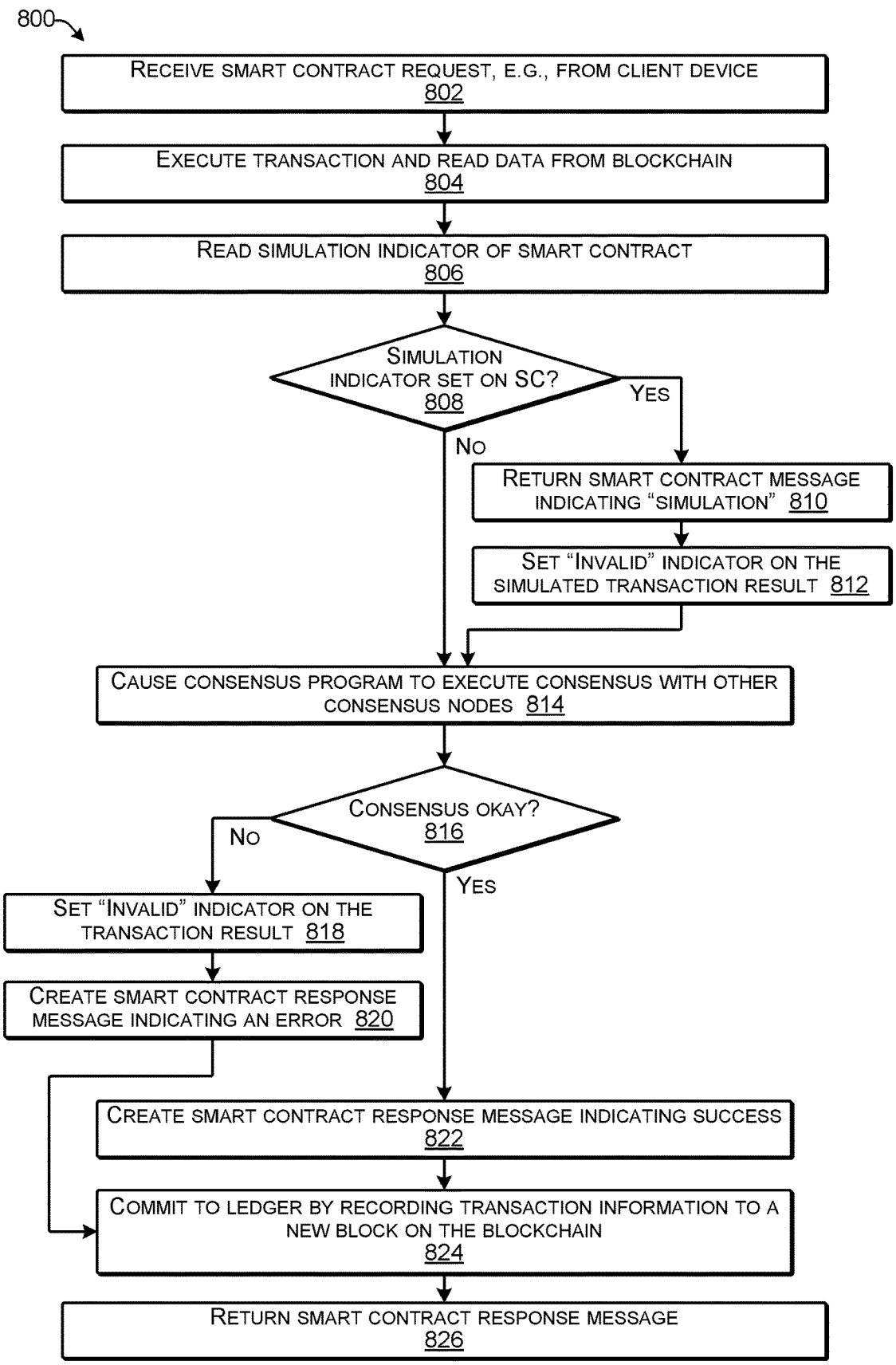
FIG. 8 is a flow diagram illustrating an example process for executing a smart contract with a blockchain that stores both valid and invalid transaction results according to some implementations.

FIG. 8 is a flow diagram illustrating an example process for executing a smart contract that is configured to store both valid and invalid transaction results according to some implementations. As one example, the smart contract 106 discussed above, e.g., with respect to FIG. 1, may receive a smart contract request 126, such as from the client computing device 108, and may execute a transaction in response to receiving the request. The smart contract may return a smart contract message 130 to the client computing device 108 in response to the smart contract request 126. In examples herein, causing a smart contract to "execute a transaction" may mean invoking one or more functions of the smart contract 106. The invoked functions may include logic to read and/or write data on the blockchain. In the example of FIG. 8, all transactions are stored on the blockchain regardless of whether the transactions are valid or invalid. As one example, blocks that are added to the blockchain for invalid transactions may be marked as being invalid.

In some examples, the process 800 may be executed in part by the node program 114 and in part by the smart contract 106 itself. For example, the node program 114 may manage a plurality of smart contracts and corresponding blockchains on the consensus node 102. The node program 114 may receive and may respond to communications from client computing devices, external computing devices, and other consensus nodes 102. Furthermore, the node program may determine which smart contract a received communication applies to, and may invoke the particular smart contract that is the target of a communication based on a smart contract ID, client computing device ID, user ID, or other identifier associated with a received communication.

At 802, the consensus node may receive a smart contract request, e.g., from the client computing device, and may submit or otherwise provide the received request to a particular smart contract corresponding to the request to invoke the smart contract to perform a transaction based on the request. Blocks 704 and 706 of FIG. 7 may also be executed here.

At 804, the smart contract executes a transaction in response to the smart contract request. During execution of the transaction, the smart contract may read at least a portion of the data on the blockchain.

At 806, the smart contract reads the simulation indicator of the smart contract. For example, each smart contract may have flag (e.g., a bit, or the like) associated with it that may be turned on or off for indicating whether the smart contract is in simulation mode.

At 808, the smart contract determines whether the simulation indicator is set to simulation or not. If the simulation indicator is set, the process goes to 810 to return the result of the transaction to the client computing device. In this example, the result of the transaction is also added to a new block in the blockchain as an invalid transaction. For instance, since the smart contract is operating in simulation mode, and therefore the expiration time of the smart contract has already passed, the result of the transaction is used only to access data. Accordingly, to prevent the transaction result from becoming effective on the ledger, i.e., the blockchain, an invalid flag is set for the transaction result to indicate an invalid transaction. Thus, even though a new block is added to the blockchain, the block may be marked as invalid. On the other hand, if the simulation indicator is not set, the process proceeds to 814.

At 810, if the simulation indicator is set, the smart contract returns the result of the transaction simulation to the client computing device as a smart contract message. The smart contract returns the smart contract message with an indication of simulation. For example, as illustrated and discussed above with respect to FIG. 4C, the message may include the smart contract ID, type, status, message, payload, and timestamp. For instance, the type is set as "simulate response", as discussed above.

At 812, the smart contract sets an invalid flag on the transaction result. As mentioned above, since the smart contract is operating in simulation mode, and therefore the expiration time of the smart contract has already passed, the result of the transaction is used only to access data. Therefore, an invalid flag is set for the transaction result to indicate an invalid transaction. Thus, even though a new block is added to the blockchain, the block may be marked as invalid.

At 814, the smart contract causes the consensus program to execute a consensus operation with the other consensus nodes 102 for determining whether there is a consensus on the transaction result. Any of various known consensus programs may be used for determining a consensus for the transaction result. As one example, a primary consensus node may be designated within the system to determine whether some or all of the consensus nodes 102 have reached a consensus on the transaction result. The primary node may then inform the other consensus nodes 102 of the consensus, or lack thereof. Numerous other variations will be apparent to those of skill in the art having the benefit of the disclosure herein.

At 816, the smart contract receives the response from the consensus program 116 and determine whether a consensus was reached or not. If a consensus was reached, the process proceeds to 822. On the other hand, if consensus was not reached, the process proceeds to 818.

At 818, if consensus was not reached, the smart contract sets an invalid flag on the transaction result. Because a transaction result that does not obtain a consensus is invalid, the invalid flag is set before committing the transaction information to the blockchain. Further, in the case of the simulation indicator being set, the transaction result will have already had the invalid flag set at 812 above.

At 820, the smart contract creates a smart contract message indicating an error. For example, as illustrated and discussed above with respect to FIG. 4B, the message may include the smart contract ID, type, status, message, payload, and timestamp. For instance, the type may be set as "invoke response" and the status may be set as "error".

At 822, on the other hand, if the simulation indicator is not set, and a consensus is reached for the transaction result, the smart contract creates a smart contract message indicting success. For example, as illustrated and discussed above with respect to FIG. 4A, the message may include the smart contract ID, type, status, message, payload, and timestamp. For instance, the type may be set as "invoke response" and the status may be set as "success".

At 824, the smart contract 106 commits the transaction information to the ledger, i.e., by writing at least the result of the transaction to a new block of the blockchain. This may take place on each consensus node in the consensus system so that all of the blockchains for the same smart contract are the same on all of the consensus nodes. As mentioned above, if a transaction result has an invalid flag associated with it, the new block may be marked as invalid.

At 826, the smart contract returns the smart contract message that was created at either 820 or 822.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media. Thus, the index arrangement herein may be implemented on physical hardware, may be used in virtual implementations, may be used as part of overall deduplication system on either physical or virtual machine, and/or may be as a component for other deduplication implementations (e.g., SAN) or in some non-deduplication environments, such as large scale memory indexing.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
   a first computing node able to communicate with one or more second computing nodes for participating in a consensus system which manages a plurality of blockchains, wherein the first computing node includes one or more processors configured by executable instructions to perform operations comprising:
   executing a lifecycle manager that manages a plurality of managed programs, each managed program configuring the one or more processors to perform a respective specified function in response to a respective specified condition being met, the lifecycle manager managing a lifecycle of each of the managed programs for determining whether to set a mode of each managed program as one of running mode, simulation mode, or stop mode, wherein each respective managed program of the plurality of managed programs includes a specified expiration time after which the respective managed program is only available to run in a simulation mode that allows retrieval of previously stored data from a respective blockchain, but that does not allow generation of new valid data by the respective managed program to the respective blockchain, each respective managed program further including a specified storage period specifying an amount of time that the respective managed program is stored an operable in the simulation mode after the expiration time is reached, wherein following an end of the storage period, the respective managed program is undeployed and no longer available for the running mode or the simulation mode, the lifecycle manager managing the respective managed programs by accessing a period data structure for determining a value of the expiration time for each respective managed program in the period data structure, and following reaching of the expiration time for the respective managed program, determines a value of the storage period in the period data structure, and based on determining that the expiration time is reached and the storage period has not yet ended, sends a configuration request to a managed program configurator to cause the managed program configurator to configure the respective managed program in the simulation mode at least by setting a status of the respective managed program to simulation mode in the period data structure;

executing a first managed program, of the plurality of managed programs, that configures the one or more processors to perform a first specified function in response to a first specified condition being met, the first managed program executed in the running mode configuring the one or more processors to store data related to performing the first specified function in one or more blocks of a first blockchain of the plurality of blockchains based on a consensus of the first computing node and the one or more second computing nodes, the first managed program including a data query function for accessing the data stored by the first managed program in the one or more blocks of the first blockchain, the first managed program having a lifecycle managed by the lifecycle manager, the lifecycle including the expiration time which, when reached, indicates the lifecycle manager terminates the running mode and requests the first managed program be set to simulation mode, following which execution of the first managed program results in invalid data, the first managed program having a respective specified storage period following reaching of the expiration time during which execution of the first managed program in the simulation mode provides for execution of the data query function included in the first managed program for accessing the data of the first managed program stored in the one or more blocks of the first blockchain without allowing generation of new valid data by the first specified function;

receiving, by the one or more processors of the first computing node, from a client computing device, a request to execute the first managed program following the expiration time for the running mode being reached;

invoking, by the one or more processors, execution of the first managed program based on the received request to cause the first managed program to execute the data query function based on the received request, wherein executing the data query function includes reading, from the first blockchain, at least a portion of the data previously stored to the first blockchain by the first managed program prior to expiration of the running mode of the first managed program;

determining that a status of the first managed program has been set to the simulation mode, wherein the simulation mode indicates that the expiration time of the running mode the first managed program has been reached, indicating that the running mode of the first managed program has expired and the first managed program has been set to execute in the simulation mode that enables access to the data previously stored to the first blockchain by the first managed program prior to expiration of the running mode of the first managed program; and based on determining that the running mode of the first managed program has expired and that the first managed program has been set to the simulation mode, refraining from writing a result of the first specified function to the first blockchain as a valid result, and sending the result of the data query function to the client computing device in a response message, the result sent to the client computing device including at least the portion of the data previously stored to the one or more blocks of the first blockchain by the first managed program prior to the expiration time of the running mode of the first managed program being reached.

2. The system as recited in claim 1, wherein refraining from writing the result of the first function to the blockchain as a valid result comprises:

based on determining that the first managed program has a simulation mode indicator set, associating an invalid result indicator with the result; and storing the result of the first function and the invalid result indicator to a new block on the first blockchain.

3. The system as recited in claim 2, the operations further comprising:

seeking a consensus with respect to the result from the one or more second computing nodes; and based on not reaching a consensus, sending another response message indicating at least one of an error or an invalid result.

4. The system as recited in claim 1, wherein refraining from writing the result to the blockchain as a valid result comprises, based on determining that the program has a simulation mode indicator set, refraining from saving the result to a new block of the first blockchain.

5. The system as recited in claim 1, wherein the first blockchain includes a plurality of blocks maintaining information for a plurality of functions executed by the first managed program prior to the expiration time being reached.

6. The system as recited in claim 5, wherein the response message includes information read from the first blockchain that was stored in the first blockchain for at least one function executed by the first managed program prior to the expiration time being reached, the response message further including an indication that a type of the response corresponds to the simulation mode.

7. The system as recited in claim 1, the operations further comprising:

prior to receiving the request, comparing the expiration time for the first managed program with a current time;

based on the comparing, determining that the expiration time for the first managed program has been reached;

based on determining that the expiration time for the first managed program has been reached, setting a simulation mode indicator of the first managed program to simulation mode; and sending a request for program configuration.

8. The system as recited in claim 7, the operations further comprising, based on the request for program configuration, changing an entry for the first managed program in a program data structure to indicate simulation mode for the first managed program.

9. The system as recited in claim 1, subsequent to execution of the first function, the operations further comprising:

determining that a storage period for the first managed program has ended;

sending a request for program configuration to undeploy the first managed program; and changing an entry for the first managed program in a program data structure to indicate the first managed program is at least one of stopped or undeployed.

10. The system as recited in claim 9, the operations further comprising:

receiving another request for execution of the first managed program;
determining that the first managed program is at least one of stopped or undeployed; and
sending a response message indicating that the first managed program is unavailable.

11. The system as recited in claim 1, the operations further comprising:
prior to receiving, by the first computing node, the indication that the first managed program associated with the first blockchain is to be executed, receiving an earlier request for execution of the first managed program;
executing an earlier function based on the earlier request;
determining that a simulation mode indicator is not set for the first managed program; and
executing a consensus operation with the one or more second computing nodes based on a result of the earlier function.

12. The system as recited in claim 11, the operations further comprising:
based on a consensus being reached, recording the result for the earlier function to a new block in the first blockchain; and
sending, in response to the earlier request, a response message including at least the result for the earlier function and an indication of a successful performance of the earlier function.

13. The system as recited in claim 11, the operations further comprising based on consensus not being reached, sending, in response to the earlier request, a response message indicating at least one of an invalid result or an error.

14. A method comprising:
executing by a first computing node configured to communicate with one or more second computing nodes for participating in a consensus system, a lifecycle manager that manages a plurality of managed programs, each managed program configuring the one or more processors to perform a respective specified function in response to a respective specified condition being met, the lifecycle manager managing a lifecycle of each of the managed programs for determining whether to set a mode of each managed program as one of running mode, simulation mode, or stop mode, wherein each respective managed program of the plurality of managed programs includes a specified expiration time after which the respective managed program is only available to run in a simulation mode that allows retrieval of previously stored data from a respective blockchain, but that does not allow generation of new data by the respective managed program to the respective blockchain, each respective managed program further including a specified storage period specifying an amount of time that the respective managed program is stored an operable in the simulation mode after the expiration time is reached, wherein following an end of the storage period, the respective managed program is undeployed and no longer available for the running mode or the simulation mode, the lifecycle manager managing the respective managed programs by accessing a period data structure for determining a value of the expiration time for each respective managed program in the period data structure, and following reaching of the expiration time for the respective managed program, determines a value of the storage period in the period data structure, and based on determining that the expiration time is reached and the storage period has not yet ended, sends a configuration request to a managed program configurator to cause the managed program configurator to configure the respective managed program in the simulation mode at least by setting a status of the respective managed program to simulation mode in the period data structure;
executing, by the first computing node, a first managed program, of the plurality of managed programs, that configures the first computing node to perform a first specified function in response to a first specified condition being met, the first managed program executed in the running mode configuring the first computing node to store data related to performing the first specified function in one or more blocks of a first blockchain of the plurality of blockchains based on a consensus of the first computing node and the one or more second computing nodes, the first managed program including a data query function for accessing the data stored by the first managed program in the one or more blocks of the first blockchain, the first managed program having a lifecycle managed by the lifecycle manager, the lifecycle including the expiration time which, when reached, indicates the lifecycle manager terminates the running mode and requests the first managed program be set to simulation mode, following which execution of the first managed program results in invalid data, the first managed program having a respective specified storage period following reaching of the expiration time during which execution of the first managed program in the simulation mode provides for execution of the data query function included in the first managed program for accessing the data of the first managed program stored in the one or more blocks of the first blockchain without allowing generation of new valid data by the first specified function;
receiving, by the first computing node, from a client computing device, a request to execute the first managed program following the expiration time for the running mode being reached;
invoking, by the first computing node, execution of the first managed program based on the received request to cause the first managed program to execute the data query function based on the received request, wherein executing the data query function includes reading, from the first blockchain at least a portion of the data previously stored to the first blockchain by the first managed program prior to expiration of the running mode of the first managed program;
determining, by the first computing node, that a status of the first managed program has been set to the simulation mode, wherein the simulation mode indicates that the expiration time of the running mode of the first managed program has been reached, indicating that the running mode of the first managed program has expired and the first managed program has been set to execute in the simulation mode that enables access to the data previously stored to the first blockchain by the first managed program prior to expiration of the running mode of the first managed program; and
based on determining that the running mode of the first managed program has expired and that the first managed program has been set to the simulation mode, refraining from writing a result of the first specified function to the blockchain as a valid result, and sending the result of the data query function to the client computing device in a response message, the result sent to the client computing device including at least the portion of the data previously stored to the one or more blocks of the first blockchain by the first managed program prior to the expiration time of the running mode of the first managed program being reached.

15. The method as recited in claim 14, wherein refraining from writing the result of the first function to the blockchain as a valid result comprises:
based on determining that the first managed program has a simulation mode indicator set, associating an invalid result indicator with the result; and
storing the result of the first function and the invalid result indicator to a new block on the first blockchain.

16. The method as recited in claim 14, wherein refraining from writing the result to the first blockchain as a valid result comprises, based on determining that the first managed program has a simulation mode indicator set, refraining from saving the result to a new block of the first blockchain.

17. The method as recited in claim 14, wherein the response message includes information read from the first blockchain that was stored in the first blockchain for at least one function executed by the first managed program prior to the expiration time being reached, the response message further including an indication that the type of the response corresponds to the simulation mode.

18. The method as recited in claim 14, further comprising:
subsequent to execution of the first function, determining that a storage period for the first managed program has ended;
sending a request for program configuration to undeploy the first managed program; and
changing an entry for the first managed program in a program data structure to indicate the first managed program is at least one of stopped or undeployed.

19. The method as recited in claim 14, further comprising:
prior to receiving, by the first computing node, the indication that the first managed program associated with the first blockchain is to be executed, receiving an earlier request for execution of the first managed program;
executing an earlier function based on the earlier request;
determining that a simulation mode indicator is not set for the first managed program; and
executing a consensus operation with the one or more second computing nodes based on a result of the earlier function.

20. One or more non-transitory computer-readable media storing instructions which, when executed by one or more processors of a first computing node configured to communicate with one or more second computing nodes for participating in a consensus system, configure the one or more processors to:
execute a lifecycle manager that manages a plurality of managed programs, each managed program configuring the one or more processors to perform a respective specified function in response to a respective specified condition being met, the lifecycle manager managing a lifecycle of each of the managed programs for determining whether to set a mode of each managed program as one of running mode, simulation mode, or stop mode, wherein each respective managed program of the plurality of managed programs includes a specified expiration time after which the respective managed program is only available to run in a simulation mode that allows retrieval of previously stored data from a respective blockchain, but that does not allow generation of new data by the respective managed program to the respective blockchain, each respective managed program further including a specified storage period specifying an amount of time that the respective managed program is stored an operable in the simulation mode after the expiration time is reached, wherein following an end of the storage period, the respective managed program is undeployed and no longer available for the running mode or the simulation mode, the lifecycle manager managing the respective managed programs by accessing a period data structure for determining a value of the expiration time for each respective managed program in the period data structure, and following reaching of the expiration time for the respective managed program, determines a value of the storage period in the period data structure, and based on determining that the expiration time is reached and the storage period has not yet ended, sends a configuration request to a managed program configurator to cause the managed program configurator to configure the respective managed program in the simulation mode at least by setting a status of the respective managed program to simulation mode in the period data structure;
execute a first managed program, of the plurality of managed programs, that configures the one or more processors to perform a first specified function in response to a first specified condition being met, the first managed program executed in the running mode configuring the one or more processors to store data related to performing the first specified function in one or more blocks of a first blockchain of the plurality of blockchains based on a consensus of the first computing node and the one or more second computing nodes, the first managed program including a data query function for accessing the data stored by the first managed program in the one or more blocks of the first blockchain, the first managed program having a lifecycle managed by the lifecycle manager, the lifecycle including the expiration time which, when reached, indicates the lifecycle manager terminates the running mode and requests the first managed program be set to simulation mode, following which execution of the first managed program results in invalid data, the first managed program having a respective specified storage period following reaching of the expiration time during which execution of the first managed program in a simulation mode provides for execution of the data query function included in the first managed program for accessing the data of the first managed program stored in the one or more blocks of the first blockchain without allowing generation of new valid data by the first specified function;
receive, from a client computing device, a request to execute the first managed program following the expiration time for the running mode being reached;
invoke, by the one or more processors, execution of the first managed program based on the received request to cause the first managed program to execute the data query function based on the received request, wherein executing the data query function includes reading, from the first blockchain, at least a portion of the data previously stored to the first blockchain by the first managed program prior to expiration of the running mode of the first managed program;
determine that a status of the first managed program has been set to the simulation mode, wherein the simulation mode indicates that the expiration time of the running mode of the first managed program has been reached, indicating that the running mode of the first managed program has expired and the first managed program has been set to execute in the simulation mode that enables access to the data previously stored to the first blockchain by the first managed program prior to expiration of the running mode of the first managed program; and based on determining that the running mode of the first managed program has expired and that the first managed program has been set to the simulation mode, refraining from writing a result of the first specified function to the first blockchain as a valid result, and send the result of the data query function to the client computing device in a response message, the result sent to the client computing device including at least the portion of the data previously stored to the one or more blocks of the first blockchain by the first managed program prior to the expiration time of the running mode of the first managed program being reached.

\* \* \* \* \*